July 7, 1936. H. F. PHILLIPS ET AL 2,046,839

SCREW

Filed Jan. 15, 1935

HENRY F. PHILLIPS
AND THOMAS M. FITZPATRICK
INVENTORS

BY James D. Givnan
ATTORNEYS.

Patented July 7, 1936

2,046,839

UNITED STATES PATENT OFFICE 2,046,839

SCREW

Henry F. Phillips and Thomas M. Fitzpatrick, Portland, Oreg., assignors to Phillips Screw Company, Wilmington, Del.

Application January 15, 1935, Serial No. 1,946

6 Claims. (Cl. 85—45)

This invention is directed to new and useful improvements in screws, the nature of which is specifically outlined in an application for Letters Patent of the United States, entitled Screws, Serial Number 670,118, filed May 9, 1933, of which this application is a continuation in part.

Heretofore, the manufacture of screws with a cruciform or other shape of recess has been impractical, several proposed types requiring casting, which is so expensive as to render manufacturing costs prohibitive. Other types require broaching, but this operation pushes the metal ahead of the broaching tool and so disturbs the distribution of metal as to render the screw head extremely fragile.

As pointed out in said prior application, one of the principal objects of the invention is the provision of a recess in the head of a screw which is particularly adapted for firm engagement with a correspondingly shaped driving tool or screw driver, and in such a way that there will be no tendency of the driver to cam out of the recess when united in operative engagement with each other.

Another object of the present invention is to provide a screw head with a tool-receiving recess which may be produced by a simple punching operation and at the same time preserve all of the desirable virtues of the screw head and the recess therein, and which results in certain additional advantages, namely, the screw head is left stronger near the outer edge than heretofore possible; the recess firmly and accurately receives the driver and causes the driver to centralize itself with respect to the screw head.

These and other objects will appear as our invention is more fully hereinafter described in the following specification, illustrated in the accompanying drawing, and finally pointed out in the appended claims.

Figure 1:
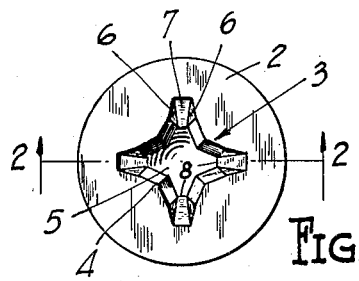
Figure 1 is a top plan view of a screw showing our new form of tool receiving recess formed therein.

Referring now more particularly to the drawing:

Reference numeral 1 indicates a wood screw, although it is to be understood that the invention is applicable to machine screws, bolts and other similar connectors or screw shafts. The head of the screw is indicated at 2, and while we have shown a flat-head, it is also to be understood that the invention is applicable to any other form of screw head, such as round-head, fillister head, oval head, or as a matter of fact, it may even be applied to the headless end of any screw shaft.

In practicing the invention, the head of the screw is formed with a tool receiving recess of polygonal configuration, which is preferably punched by a tool having a bit on one of its ends of identical shape to that of the recess. The recess tapers from its outer edges downwardly toward the longitudinal center line of the screw to any desired depth and terminates in a blunt or concave bottom, preferably of such depth that the point of maximum concavity lies within the shank of the screw. Also, the outline of the bottom is preferably identical in shape with the top of the recess.

The recess, designated as an entirety by the reference numeral 3, is of generally polygonal configuration and comprises diametrically opposed intermediate walls or angular faces 4, (Figure 1) converging toward the longitudinal center-line of the screw and merging into the bottom of the recess.

The bottom of the recess, as previously pointed out, is blunt and preferably concave. In any case, however, the bottom of the recess should be of sufficient area and contour to complement the lowermost end of a tool or driver adapted to fit precisely within the recess. In producing these screws a punch is used which is identical in shape with that of the recess and also with that of the driver. The lowermost end of the punch is generally convex or blunt, so that during the punching of the recess there will be an equal distribution of metal in all directions laterally from an axial starting point instead of a compression altogether in advance of the punch.

The intermediate walls or angular faces 4 of the recess merge at their ends into tool receiving grooves, each of which is formed with side walls 6 which converge downwardly toward each other and unite with a substantially flat bottom wall 7 which tapers from the outer surface inwardly toward the bottom of the recess. All of said walls converge to the bottom of the recess as at 8. It will be noted that the adjacent side walls 6 of each groove diverge from the outer edge of the groove toward the axis of the screw.

Figure 3:
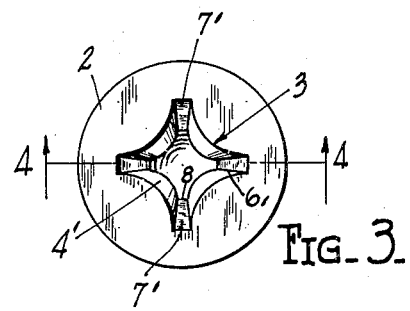
Figure 3 is a top plan view of a modified form of tool-receiving recess formed in a screw head.

The said intermediate walls 4, intermediate the grooves, may be of generally convex formation comprising a plurality of angular faces, as shown in Figure 1, or they may be curved as shown in Figure 3; the principal point in either form being that the side and bottom walls of the tool engaging grooves converge into the bottom of the recess and that the side walls of the grooves merge with the side walls of the recess.

It has been found that by employing a recess such as that described, numerous advantages are obtained; since the grooves are of gradually increasing width from their outer edges inwardly toward the axis of the screw, the wings or vanes on the driving tool which are shaped to fit the grooves can be made strong and rigid and such tool will have little or no tendency to cam out of the recess of the screw in driving the same; also the shape of the recess and grooves is such that the operation of punching the recess can be carried on without particular difficulty and without breaking or rupturing the head of the screw which heretofore has been very difficult or unavoidable.

Figure 2:
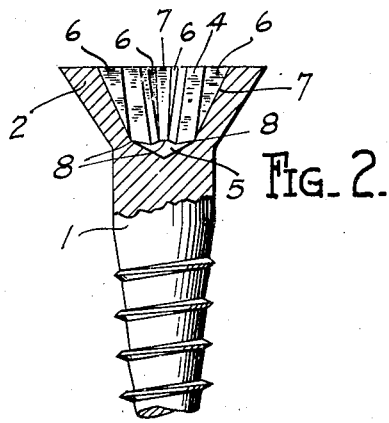
Figure 2 is a sectional side elevation of Figure 1, taken on the line 2—2 of Figure 1.
Figure 4:
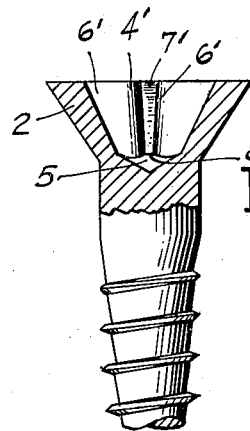
Figure 4 is a sectional side elevation of Figure 3 taken on the line 4—4 of Figure 3.

In the modified form of the invention illustrated in Figures 3 and 4, the intermediate walls 4' are convex as shown. The side walls 6' and flat bottom wall 7' of each tool receiving groove are substantially identical with those shown in Figures 1 and 2, and all of said walls as well as the intermediate walls 4' taper from the outer surface of the screw head inwardly toward the bottom of the recess. Likewise, each groove is also of gradually increasing width from its outer edges toward the axis of the screw.

We claim:

1. A screw having a recess in the head thereof provided with a concave bottom extending transversely of the axis of the screw, said recess having tapering convex side walls diverging upwardly from the bottom to the top of the recess, tool-receiving grooves extending radially from the recess and having side walls which merge throughout their length with the convex side walls of the recess.

2. A screw as defined in claim 1 in which said tool receiving grooves are of gradually increasing width from their outer edges toward the axis of the screw.

3. A screw having a head, a tool receiving recess of polygonal configuration formed in the head of the screw, said recess comprising a plurality of tapered tool engaging grooves, each groove having flat tapered side walls and a flat tapered bottom wall, a plurality of contiguous walls intermediate the grooves and merging at an angle with the edges of the side walls of the grooves, said contiguous walls being formed of a plurality of angularly disposed faces.

4. A screw having a head, a tool receiving recess of polygonal configuration formed in the head of the screw, said recess comprising a plurality of tapered tool engaging grooves, each groove having flat tapered side walls and a flat tapered bottom wall, a plurality of contiguous walls intermediate the grooves and merging at an angle with the edges of the side walls of the grooves, said contiguous walls being formed of a plurality of angularly disposed faces, and the bottom of said recess being substantially concave in form.

5. A screw having a head, a tool receiving recess formed in the head of the screw, said recess comprising a plurality of equidistant and diametrically opposed tapered tool engaging grooves, each groove having tapered side walls and a tapered bottom wall, each of said grooves being of gradually increasing width from the outer edge thereof toward the axis of the screw, the walls of the recess intermediate the grooves merging with the side walls of the grooves, the bottom of the recess being substantially concave in form and all of said walls merging into said concave bottom.

6. A screw having a head, a tool receiving recess formed in the head of the screw, said recess comprising a plurality of equidistant and diametrically opposed tapered tool engaging grooves, each groove having tapered side walls and a tapered bottom wall, each of said grooves being of gradually increasing width from the outer edge thereof toward the axis of the screw, the walls of the recess intermediate the grooves merging with the side walls of the grooves, the bottom of the recess being substantially concave in form and all of said walls merging into said concave bottom, and said bottom having its lowest part within the shank of the screw and its upper part within the head of the screw.

HENRY F. PHILLIPS.
THOMAS M. FITZPATRICK.